US012572934B2

(12) United States Patent
Peddinti et al.

(10) Patent No.: US 12,572,934 B2
(45) Date of Patent: Mar. 10, 2026

(54) SYSTEM AND METHOD FOR IMPLEMENTING AN EDGE QUEUING PLATFORM

(71) Applicant: Walmart Apollo, LLC, Bentonville, AR (US)

(72) Inventors: Ravi Kumar Peddinti, Wilton, CT (US); Jason Bradley Niesz, Reston, VA (US); Or Ricon, Chapel Hill, NC (US); Joel Anastacio Guerra, Tacoma, WA (US); Raymond Chan, Astoria, NY (US); Kevin Elliot Bauer, Moorestown, NJ (US); Danilo Kulaif Ubaid, Winter Garden, FL (US); Jiawei Zhang, Pleasanton, CA (US); Neeraj Prasad, Santa Clara, CA (US); Kiran Reddy, Fremont, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 398 days.

(21) Appl. No.: 17/811,083

(22) Filed: Jul. 7, 2022

(65) Prior Publication Data

US 2024/0013270 A1     Jan. 11, 2024

(51) Int. Cl.
*G06Q 20/40* (2012.01)
*G06Q 30/0601* (2023.01)

(52) U.S. Cl.
CPC ....... *G06Q 20/401* (2013.01); *G06Q 30/0637* (2013.01)

(58) Field of Classification Search
CPC ............. G06Q 30/0609; G06Q 10/087; G06Q 20/401; G06Q 30/0637
See application file for complete search history.

(56) References Cited

U.S. PATENT DOCUMENTS

2002/0152180 A1* 10/2002 Turgeon ................ H04L 9/3226
                                                               705/72
2007/0130313 A1*  6/2007 King ..................... H04L 67/564
                                                               709/223

(Continued)

OTHER PUBLICATIONS

Rafati Niya S, Bachmann S, Brasser C, Bucher M, Spielmann N, Stiller B. DeTi: A Decentralized Ticketing Management Platform. J Netw Syst Manage. 2022;30(4):62. doi: 10.1007/s10922-022-09675-3. Epub Jul. 26, 2022. PMCID: PMC9315850. (Year: 2022).*

(Continued)

*Primary Examiner* — Jeffrey A. Smith
*Assistant Examiner* — Latasha D Ramphal
(74) *Attorney, Agent, or Firm* — Morgan, Lewis & Bockius LLP; Manita Rawat

(57) ABSTRACT

This application relates to a system, method, and non-transitory computer readable medium for implementing a queuing platform. In some embodiments, a user request is received and it determined whether the user request matches predetermined criteria. Embodiments can include assigning the user request to an item queue and issuing a ticket. In further embodiments, the ticket is validated and an access token is transmitted to the user device based on the validation of the ticket. A checkout request corresponding to the at least one user request is received and validated. In some embodiments, the user request is transmitted from the item queue to a checkout engine to complete a purchase of the item based on the validation of the access token received in the checkout request.

20 Claims, 5 Drawing Sheets

(56)         References Cited

U.S. PATENT DOCUMENTS

| | | | |
|---|---|---|---|
| 2010/0040222 A1 | 2/2010 | Anderson et al. | |
| 2016/0127211 A1* | 5/2016 | Hirose .............. | G06Q 30/0601 |
| | | | 709/224 |
| 2017/0070522 A1* | 3/2017 | Bailey .................... | G06F 21/32 |
| 2017/0316400 A1* | 11/2017 | Venkatakrishnan ........................ | |
| | | | G06Q 20/3227 |
| 2022/0394058 A1* | 12/2022 | Meunier ............. | H04L 63/1441 |

OTHER PUBLICATIONS

"Queue-it: Add A Virtual Waiting Room To Your Website To Manage High Traffic Surges", Queue-It, Feb. 4, 2022, 40 pages.
"Absorb large bursts of traffic to your website with the AWS Virtual Waiting Room", Amazon Web Services, Nov. 2021, 11 pages.
"Prevent Website Overload with a Virtual Waiting Room" Section, Sep. 20, 2018, 6 pages.

* cited by examiner

SYSTEM AND METHOD FOR IMPLEMENTING AN EDGE QUEUING PLATFORM

TECHNICAL FIELD

The disclosure relates generally to managing network traffic and, more specifically, to an edge queuing platform to manage requests within a retail environment.

BACKGROUND

Many retailers and online marketplaces allow customers to search their websites to purchase various items. Periodically, retailers update the items in their catalogs and/or online offerings that are made available for customers to purchase. However, the introduction of "hot" items or items that are in high-demand can direct increased traffic to the retailer's enterprise network and infrastructure. For example, hot items added during a door buster sale or limited holiday sale can attract more than normal traffic to the enterprise network, and the unexpected spike in network traffic can cause various challenges for the enterprise network if it is not equipped to manage the increased traffic. Oftentimes, these traffic spikes occur in a very compressed timescale resulting in the retailer's website crashing and ultimately frustrating its customers. Additionally, bot traffic may exacerbate the issue by flooding the enterprise network with additional traffic that is competing with genuine users wishing to purchase the hot items. As such, there may be opportunities to implement a queueing mechanism and platform to prevent overloading of the enterprise infrastructure.

SUMMARY

The embodiments described herein are directed to a system and related methods for implementing a queuing platform to manage spikes in user traffic. In addition to or instead of the advantages presented herein, persons of ordinary skill in the art would recognize and appreciate other advantages as well.

In accordance with various embodiments, exemplary systems may be implemented in any suitable hardware or hardware and software, such as in any suitable computing device.

In some embodiments, a system is provided for implementing a queuing platform to manage spikes in user traffic. In some embodiments, the computing device, such as a server, comprises a processor that is configured to receive at least one user request for an item from a user device. The embodiments may determine whether the at least one user request matches one or more predetermined criteria. In some embodiments, the system may be configured to assign the at least one user request to an item queue based, at least in part, on the determination of whether the user request matches the one or more predetermined criteria. Some embodiments may transmit a ticket to the user device based on the assignment of the at least one user request to the item queue. The ticket can include queue position information indicative of a position of the at least one user request in the item queue. The embodiments may validate the ticket transmitted to the user device. In some embodiments, the system is configured to transmit an access token to the user device based on the validation of the ticket. By using tickets, some embodiments of the invention can implement bot detection. Embodiments may receive, from the user device, a checkout request corresponding to the at least one user request in the item queue, wherein the checkout request comprises the access token. Additionally, some embodiments may validate the access token received in the checkout request. Further, the embodiments may transmit the at least one user request from the item queue to a checkout engine to complete a purchase of the item based on the validation of the access token received in the checkout request.

In some embodiments, a computer-implemented method is provided for implementing a queuing platform to manage spikes in user traffic. The computer-implemented method includes: receiving at least one user request for an item from a user device; determining whether the at least one user request matches one or more predetermined criteria; assigning the at least one user request to an item queue based, at least in part, on the determination of whether the user request matches the one or more predetermined criteria; transmitting a ticket to the user device based on the assignment of the at least one user request to the item queue, wherein the ticket comprises queue position information indicative of a position of the at least one user request in the item queue; validating the ticket transmitted to the user device; transmitting an access token to the user device based on the validation of the ticket; receiving, from the user device, a checkout request corresponding to the at least one user request in the item queue, wherein the checkout request comprises the access token; validating the access token received in the checkout request; and transmitting the at least one user request from the item queue to a checkout engine to complete a purchase of the item based on the validation of the access token received in the checkout request.

In yet other embodiments, a non-transitory computer readable medium having instructions stored thereon is provided. The instructions, when executed by at least one processor, cause a device to perform operations comprising: receiving at least one user request for an item from a user device; determining whether the at least one user request matches one or more predetermined criteria; assigning the at least one user request to an item queue based, at least in part, on the determination of whether the user request matches the one or more predetermined criteria; transmitting a ticket to the user device based on the assignment of the at least one user request to the item queue, wherein the ticket comprises queue position information indicative of a position of the at least one user request in the item queue; validating the ticket transmitted to the user device; transmitting an access token to the user device based on the validation of the ticket; receiving, from the user device, a checkout request corresponding to the at least one user request in the item queue, wherein the checkout request comprises the access token; validating the access token received in the checkout request; and transmitting the at least one user request from the item queue to a checkout engine to complete a purchase of the item based on the validation of the access token received in the checkout request.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

Figure 1:
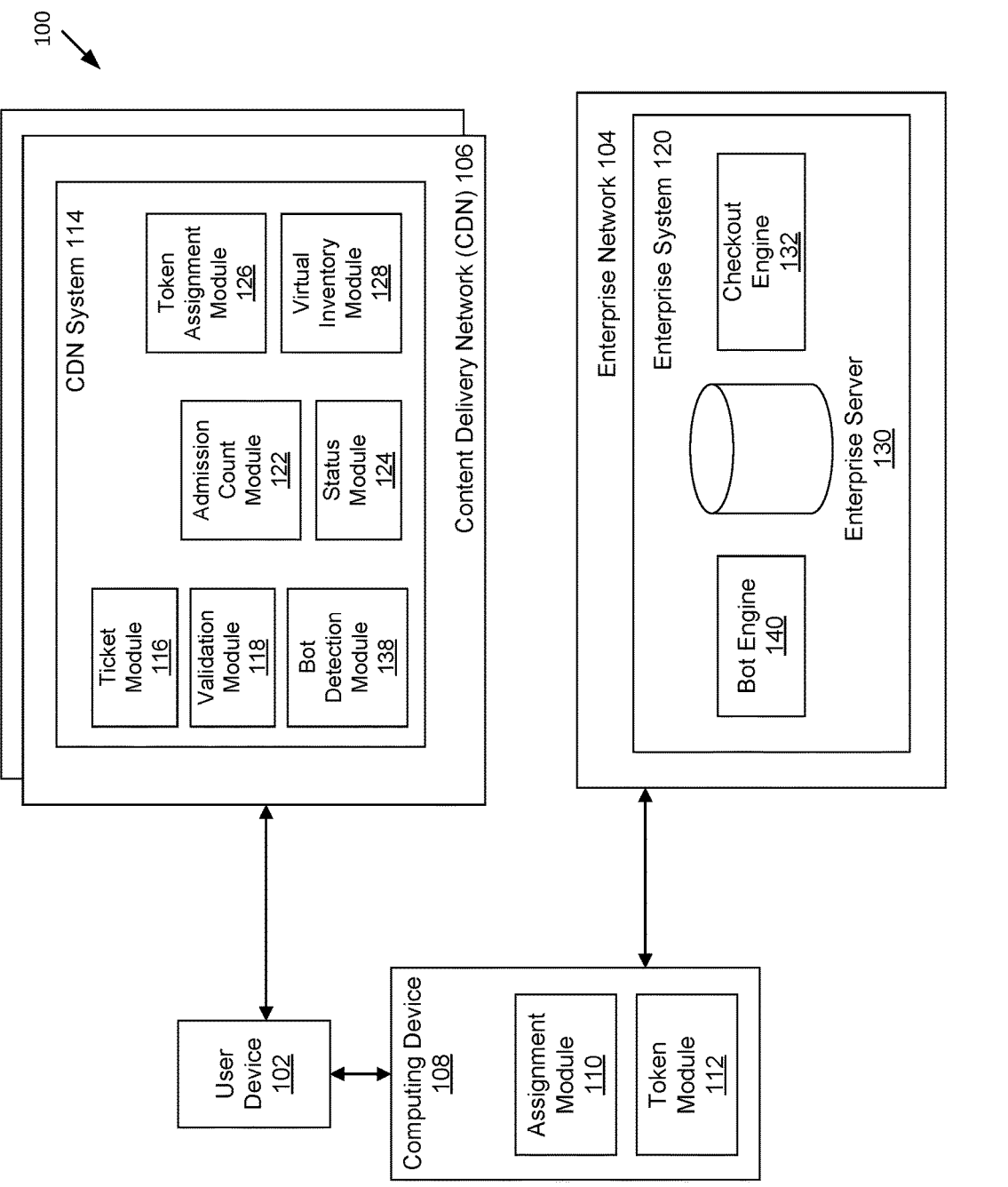
FIG. 1 is a block diagram of an exemplary queuing platform that may be implemented in accordance with one or more embodiments of the invention.

Throughout the drawings, identical reference numbers designate similar, but not necessarily identical elements. The figures are not necessarily to scale, and the size of some parts may be exaggerated to more clearly illustrate the example shown. Moreover, the drawings provide examples and/or implementations consistent with the description. However, the description is not limited to the examples and/or implementations provided in the drawings.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship."

In various examples, an array of traffic management strategies can be implemented to control the admission of user traffic into an enterprise network. Conventional algorithms include pre-scaling or scheduled scaling of network resources to prepare for increased traffic events. However, these strategies may be very costly and inflexible. In one conventional traffic management strategy, a waitlist may be implemented based on user session data where users can be sequentially added to the waitlist. Subsequently, users are selected from the waitlist according to the availability. In another traffic management strategy, a request-based rate limit can be implemented which enforces an upper bound/ hard limit of the maximum number of requests that are allowed into the network during a period of time to protect the network from being overloaded. This strategy can avoid reaching and/or exceeding an absolute request rate limit for the session. In a different traffic management strategy, a connection limit can be used to manage the network traffic. In this particular strategy, a connection limit is used to establish a maximum number of simultaneous connections that are allowed to connect to the enterprise network at a given time. However, this type of traffic management strategy does not implement any type of priority based on the request type. Therefore, when the connection limit is reached, users will experience errors regardless of the priority of the request. Each of these conventional mitigation strategies results in inconsistent customer experiences with in stock/out of stock experiences, poor user status updates/ messaging, and randomly throttled users due to the unpredictable variability of network traffic.

Turning now to one or more embodiments of the invention a queuing platform is provided. Among other benefits, the examples described herein provide for a flexible queuing platform that can dynamically control and modify the admission rate of user traffic to the enterprise network by offloading the user traffic to a content delivery network. The admission rate of the user traffic can be dynamically modified based at least in part on customer conversion rates of completed purchases and cancellation rates when purchasing the hot items. The technical effects and benefits of one or more embodiments of the invention further include providing a multi-layer bot protection mechanism for the queued requests for the high-demand items. Additionally, the number of users that are allowed through the queue for each item queue is mapped to the virtual inventory for each item. The queue can be configured to only allow a specific number of users through the queue while providing support to queue an unlimited number of requests to protect the enterprise network. Embodiments of the invention can provide instant feedback to a user when the user joins an item queue where the feedback indicates the probability of the user purchasing the item (e.g., guaranteed, likely, unlikely). The feedback may be based on the virtual inventory. Additionally, the feedback can further provide custom meta-data (item image, pricing, description) to the users. Users may also continue to shop for other items and navigate the website while their user request is pending in the item queue. The queuing platform also provides protected paths to block any type of attempt to bypass the item queue without authorization and protection is built into the checkout process to ensure users have gone through the queue. Although the queuing platform is discussed with reference to the purchase of high-demand items, it can be appreciated that the queueing platform can be implemented for any event, such as checkout or account sign-ups, that increases user traffic on a network.

In some implementations, the queuing platform can be a multi-region queue implementation that can instantly scale due to extreme traffic with zero latency. Additionally, the queuing platform can be configured to automatically "heal" itself in the event a regional failure is experienced because the queuing platform can be built using a plurality of content delivery networks, unlike conventional queueing solutions. Without a failover mechanism, users would lose their place in line incurring downtime if a failure is experienced because these conventional queuing solutions are implemented in a single region. Persons of ordinary skill in the art would recognize additional advantages as well.

FIG. 1 is a block diagram illustrating examples of various portions of a network computer system 100 that is used to implement a queuing platform for an enterprise network in accordance with one or more embodiments of the invention. As illustrated in FIG. 1, user devices 102 are operatively coupled to one or more networks such as enterprise network 104 and content delivery network (CDN) 106. In some embodiments, CDN 106 may be a plurality of CDNs 106. In some implementations, user devices 102 can be operated by users or human agents. User devices 102 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, enterprise networks 104 and CDN 106. Additionally, user devices 102 can include a cellular phone, a smart phone, a tablet, a personal assistant device, a voice assistant device, a digital assistant, a laptop, a computer, a web browser, or any other suitable device. In some examples, network computer system 100 and user device 102 are operated and/or controlled by a retailer, and user devices 102 are operated by customers of the retailer.

With respect to examples as described, computing device 108 can be implemented on a server, on a combination of servers, and/or on a distributed set of computing devices which communicate over a network such as the Internet. Still further, some examples provide for computing device 108 to be distributed using one or more servers and/or mobile devices. The computing devices 108 may be implemented in a plurality of CDNs 106 to facilitate the queuing platform. In some variations, computing device 108 can be implemented as part of, or in connection with an ecommerce system or enterprise system 120. In some examples, network computer system 100 can cause information associated with an enterprise system 120 to be displayed or otherwise communicated via one or more websites on user devices 102. Users can view, browse and order items that may be made available via the enterprise system 120 through a user device (e.g., user device 102).

With examples described, a network computing device can be implemented as, or otherwise utilize a distributed computing system. In example, a network computing device can include, or otherwise utilize user devices 102 to acquire information (e.g., interactions with intents) and/or display content corresponding to the determined predicted intents.

One or more examples described herein provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

Additionally, one or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines. Moreover, examples described herein can generally require the use of specialized computing devices, including processing and memory resources. For example, one or more examples described may be implemented, in whole or in part, on computing devices such as servers, desktop computers, cellular or smartphones, personal digital assistants (e.g., PDAs), laptop computers, printers, digital picture frames, network equipment (e.g., routers), wearable computing devices, and tablet devices. Memory, processing, and network resources may all be used in connection with the establishment, use, or performance of any example described herein (including with the performance of any method or with the implementation of any system). For instance, a computing device coupled to a data storage device storing the computer program and configured to execute the program corresponds to a special-purpose computing device. Furthermore, any computing systems referred to in the specification may include a single processor or may be architectures employing multiple processor designs for increased computing capability.

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

Some embodiments may employ real-time item level traffic surge control by filtering traffic directed to hot items (e.g., high-demand items) from CDN 106 and manage the amount of traffic that is allowed to enter the enterprise infrastructure. Enterprise vendors, such as ecommerce and media companies, often obtain the services of a CDN 106 to deliver their data to end users. CDN 106 is a geographically distributed group of interconnected servers that work together to provide fast delivery of internet content. By managing the traffic for high-demand items, the chances of overloading the enterprise network 104 can be greatly reduced improving network performance and customer experience. Also, by implementing the queue management platform in CDN 106 or a plurality of CDNs 106, resources are not required to be statically allocated for a fixed duration. That is, the queueing platform can dynamically scale and configure one or more queues on-demand. Additionally, because CDN 106 is a geographically distributed network it avoids the single point of failure for implementing the queueing platform and provides a robust solution including redundancy.

In some implementations, enterprise network 104 can include one or more processing modules such as a checkout/ purchase engine, a bot analytics engine, etc. It can be appreciated that the enterprise network 104 can include other components such as servers, processors, databases, etc. and is not limited by the example shown in FIG. 1. It can also be appreciated that the enterprise system 120 can be implemented in various cloud platforms and is not limited to a single private cloud platform. In a non-limiting example, enterprise network 104 can be configured as a data center for the retailer. In some embodiments, enterprise network 104 is geographically remote from the CDN 106. Enterprise network 104 can include one or more enterprise systems 120 to process various transactions for its customers. Enterprise network 104 can also receive user requests to purchase items that are offered in the retailer's catalog. Enterprise network 104 is configured to receive and process both user requests that have bypassed the item queue and user requests that are received from the item queues of the queuing platform. Enterprise system 120 can include an enterprise server 130 which can store and/or process information associated with the retailer such as but not limited to items that are offered for sale, user profiles, user purchase histories, etc. Enterprise system 120 also includes a checkout engine 132 configured to process user requests to checkout and complete the purchase of items. It can be appreciated that enterprise system 120 can include other system components and/or a different arrangement of components to facilitate the ecommerce transactions and is not limited by the illustration shown in FIG. 1.

In further embodiments, enterprise network 104 can be configured to communicate with CDN system 114. Such communications can include information associated with the transactions that have been processed in the enterprise network 104 including canceled/completed purchase information. This information can be used to update the virtual inventory data stored in the queuing platform. Additionally, in some embodiments, enterprise network 104 can include bot engine 140 which can be configured to process, analyze, and transmit information indicative of a bot or information indicative of fraud to CDN 106 that can be used to admit one or more requests to the queue. For example, bot engine 140 may be able to identify multiple join requests for an item queue from the same customer identifier (ID), request frequency based on the customer ID or source network, timing data indicating how often clients are calling issue or validate tickets, client fingerprinting, and/or bot scores generated by one or more bot scoring engines (not shown). The information can be used to determine whether it is likely that the queued user request is a bot request and if so, the user request in the item can be blocked.

In various implementations, computing device 108 is part of CDN 106 and can be configured to direct and redirect user traffic to enterprise network 104 in accordance with one or more embodiments of the invention. It can be appreciated that CDN 106 for the queue platform may be implemented in a different CDN 106 from the CDN 106 that performed the initial queue assignment. Computing device 108 is configured to receive and analyze the user requests from a user device 102 and is further configured to determine whether one or more portions of the user requests match various criteria indicating a request for a hot item. For example, computing device 108 can determine whether any portion of the user request matches a URL path, an HTTP header, post information, etc. that is associated with a hot item. If the user request is not for a high-demand item, computing device 108 can forward the user request to the enterprise network 104 for processing to complete the purchase of the item. Alternatively, if the user request is directed to a high-demand item, the user request is assigned to an item queue by assignment module 110 and the user request can be further processed by CDN 106. Computing device 108 is further configured to receive checkout requests for hot items that correspond to user requests that have traversed the respective item queues and received an access token to enter enterprise network 104 to complete the purchase of the item. Token module 112 is configured to validate the received access token in the user request by comparing the received access token with an expected access token which has been assigned by token assignment module 126 of the CDN system 114 which is further discussed below. If the access token is valid (matches), the queued user request corresponding to the checkout request is forwarded to the enterprise network 104 to complete the checkout process for the hot item. If the access token is not valid (does not match), the user request is not forwarded to enterprise network 104. It can be appreciated that assignment module 110 and token module 112 can be implemented within the CDN 106. In some embodiments, a notification can be provided to the user device 102 to join the item queue based on the access token being invalid. As such, computing device 108 filters the flow of user requests to enterprise network 104 to prevent spikes in user traffic.

In some implementations, CDN system 114 can be implemented in CDN 106. The CDN system 114 can include system components to implement the queuing strategy in accordance with one or more embodiments of the invention. CDN system 114 can include a ticketing module 116. Ticketing module 116 is configured to issue a ticket for each received user request, where each ticket includes a serving number indicative of a position within an assigned item queue. Ticketing module 116 increments the serving number for each subsequently received user request and maintains the association between each user request and issued ticket. For example, a first user request may be assigned to ticket 1. The association between the user request and the ticket can be stored in ticketing module 116 or a database (not shown). A second user request can be assigned to ticket 2, a third user request can be assigned to ticket 3, and so on. It should be understood that other ticket information that identifies a specific ticket can be used. It can also be appreciated that the ticket module 116 can manage tickets for a plurality of different item queues and is not limited to a single item as discussed in this example. For example, shards may be used to represent tickets for different queues that may be implemented in different CDNs 106. For instance, a first queue can provide a first ticket as shard1: ticket1 and a second queue can provide a first ticket as shard2:ticket1. It can be appreciated that different ticketing schemes can be implemented and is not limited by the examples described herein.

In some embodiments of the invention, CDN system 114 can include ticket validation module 118. Ticket validation module 118 can be configured to validate the assigned ticket when the user request joined the item queue. For instance, a user request may be received including a ticket, ticket validation module 118 can compare the received ticket with the assigned ticket number. If the ticket is valid, an access token to purchase the hot item is assigned by token assignment module 126. If the ticket is not valid, an access token to purchase the item will not be assigned and the corresponding user request will not be able to traverse the item queue.

In some embodiments of the invention, CDN system 114 includes a bot detection module 138. In other embodiments, bot detection module 138 may not reside in the CDN system 114 but may be an external third-party system where the results are returned to CDN system 114 for processing. Bot detection module 138 may include a bot scoring mechanism that is used to determine the likelihood a user request is a bot request. The bot score may be assigned to a user request based on a number of factors. For example, bot detection module 138 can identify the following scenarios: a single customer ID being used across multiple IP addresses to join the item queue; a single customer ID exceeding the specified rate limit of queue joins per minute; and the same/common shipping address discovered across different customer ID's that joined the queue. It can be appreciated that additional factors can be considered by bot detection module 138 and is not intended to be limited by the examples described herein. In a non-limiting example, the bot score may range from 0-100. A higher score may indicate a higher probability that the user request is a bot request and a lower score may indicate a lower probability. In some embodiments, a threshold can be compared to the bot score and user requests that have an assigned bot score that is above a threshold may indicate the user request is "likely" a bot request. When a bot request is identified by bot detection module 138, the ticket associated with the user request can be blocked. The blocked tickets are maintained by the CDN system 114 and the user requests with the blocked tickets (invalid tickets) will not be able to get through the queue and will not be served by the enterprise network 104. In some embodiments, user requests that are associated with the blocked tickets may be silently blocked, that is no notice will be provided to the user, and the bots will remain stuck in the queue.

Also, messages are logged that further detect and flag bots by looking for patterns across issued tickets. The enhanced bot protection can include detecting bots based on prior checkout history, similar shipping addresses across accounts for the same item, age of the account, account creation information, etc. Responsive to identifying a bot, the ticket associated with the bot request is marked. Once a ticket is marked as a bot, it will get stuck in the item queue indefinitely with an endless wait time or until the event ends which operates as a silent block. By providing an infinite wait time or false wait time, the origin of the bot request will be discouraged from continuously transmitting requests until the expiration of the wait time which decreases unnecessary traffic. Otherwise, if the bot score does not indicate the user request is a bot request, the ticket is validated and an estimated wait time is returned to the user device 102. Additionally, the bot is prevented from purchasing all of the inventory for the high-demand item.

In some implementations, CDN system 114 includes a virtual inventory module 128. Virtual inventory module 128 can be configured to track the item inventory that is available for purchase and is based on a number of factors. For example, the available inventory is reduced upon the completion of the purchase of the item. In a different example, the available inventory may be increased if a completed purchase for the item is canceled. Also, the retailer may add or reduce inventory for the item which can increase or decrease the virtual inventory, respectively. By maintaining the virtual inventory, virtual inventory module 128 can ensure the number of user requests that are allowed through the item queue does not exceed the available inventory for that item. This concept provides users with instant feedback on the likelihood of purchasing the item based on their position in the queue. Additionally, CDN system 114 can provide, via status module 124, custom messaging to user device 102 based on a queue position and available inventory, such as the item is "guaranteed" or "sold out" which can enhance the user experience. The user traffic that is allowed to enter enterprise network 104 is managed to improve the operation of the enterprise network 104.

CDN system 114 can include admission count module 122 which is configured to track the number of tickets that were allowed through the queue. The admission rate may be based on a per second admission rate and/or a total admission rate. For example, the total number of user requests that may be queued for each respective item will not exceed the available inventory for the items. For instance, if the virtual inventory indicates that only 50 items are available for purchase, admission count module 122 will not validate more than 50 user requests from the queue for the particular item. In a further example, a website for the enterprise network 104 may be configured to only admit 100 user requests per second for each item queue. If the limit is reached, the user requests will not be able to enter the item queue until the next available time slot is available. Also, the size of the queue can limit the number of user queues that are admitted into an item queue. Larger item queues may queue more user requests than smaller item queues. It can be appreciated these are only examples and are not intended to limit the scope of the embodiments of the invention examples described herein. Another factor that may be used to adjust the admission count is the virtual inventory, which ensures a high sell-through rate. The virtual inventory indicates the remaining available inventory for an item based on factors including conversion rates and cancellation rates. In some instances, a user may get through the item queue and decide not to purchase the item for one reason or another. In some implementations, the item queues may have only been utilized during a limited window of time or until all of the inventory for the item has been purchased. After such an event, the item queues will be closed and any further user requests for the items will not be queued in the item.

Figure 2:
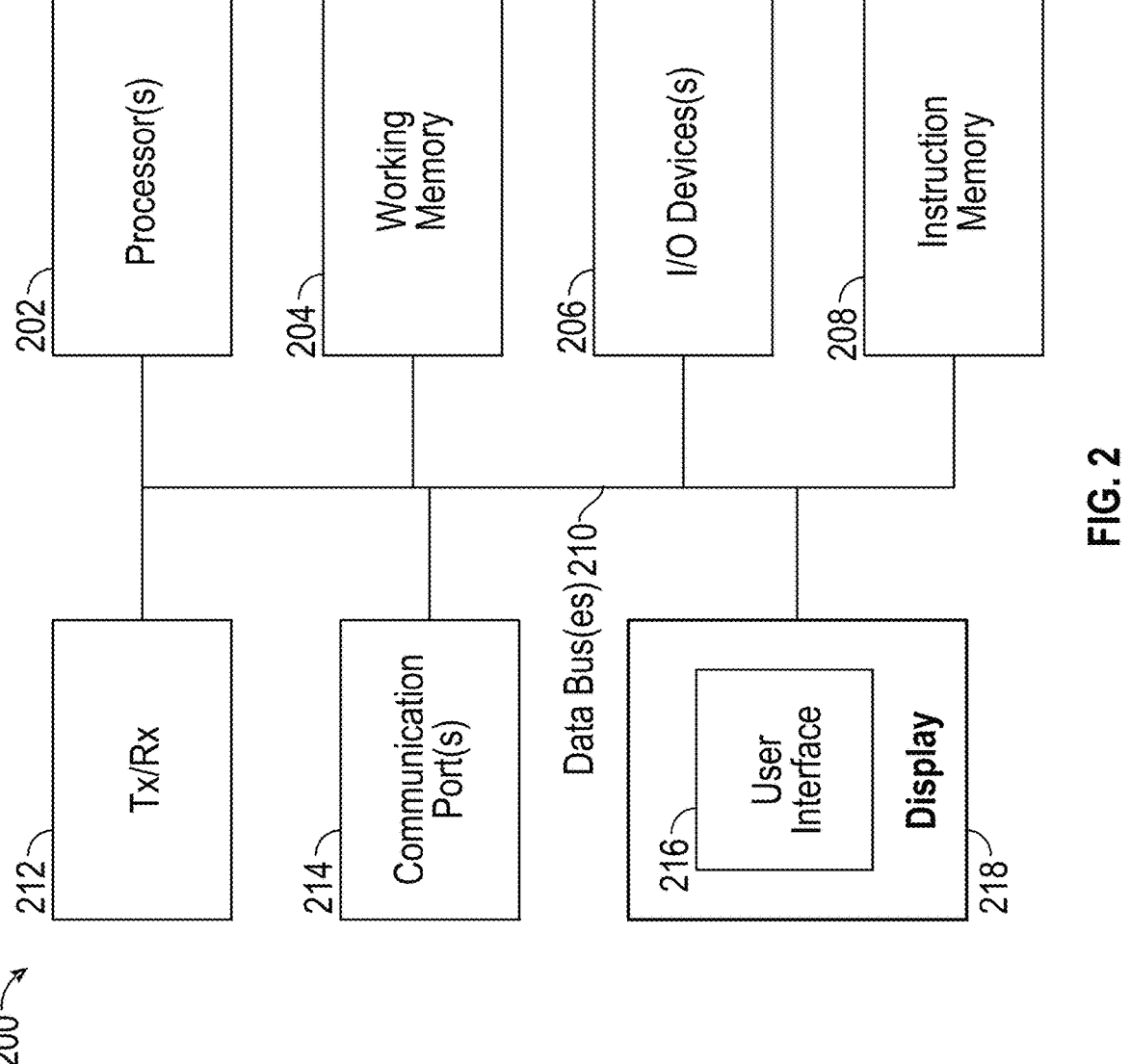
FIG. 2 is a block diagram of an exemplary system in accordance with one or more embodiments of the invention.

FIG. 2 illustrates an example computing device 200 and computing device 108 of FIG. 1 may include the features shown in FIG. 2. For the sake of brevity, FIG. 2 is described relative to computing device 108. It should be appreciated, however, that the elements described can be included, as applicable, in user devices 102, or any other network/system components of FIG. 1.

As shown, the network computer system 100 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of computing device 200. Working memory 204 can be a random access memory (RAM) such as a static random access memory (SRAM) or dynamic random access memory (DRAM), or any other suitable memory.

Input/output devices 206 can include any suitable device that allows for data input or output. For example, input/output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as recommendation data and customer interaction data.

Display 216 can display a user interface 218. User interface 218 can enable user interaction with computing device 200. For example, user interface 218 can be a user interface that allows an operator to interact, communicate, control and/or modify different features or parameters of computing device 200. The user interface 218 can, for example, display the performance of the computing device 200 using different textual, graphical or other types of graphs, tables or the like. In some examples, a user can interact with user interface 218 by engaging input/output devices 206. In some examples, display 216 can be a touchscreen, where user interface 218 is displayed on the touchscreen.

Transceiver 212 allows for communication with a network, such as the network of FIG. 1. For example, if network of FIG. 1 is a cellular network, transceiver 212 is configured to allow communications with the cellular network. In some examples, transceiver 212 is selected based on the type of network system 100 will be operating in. Processor(s) 202 is operable to receive data from, or send data to, a network, such as network of FIG. 1, via transceiver 212.

Figure 3:
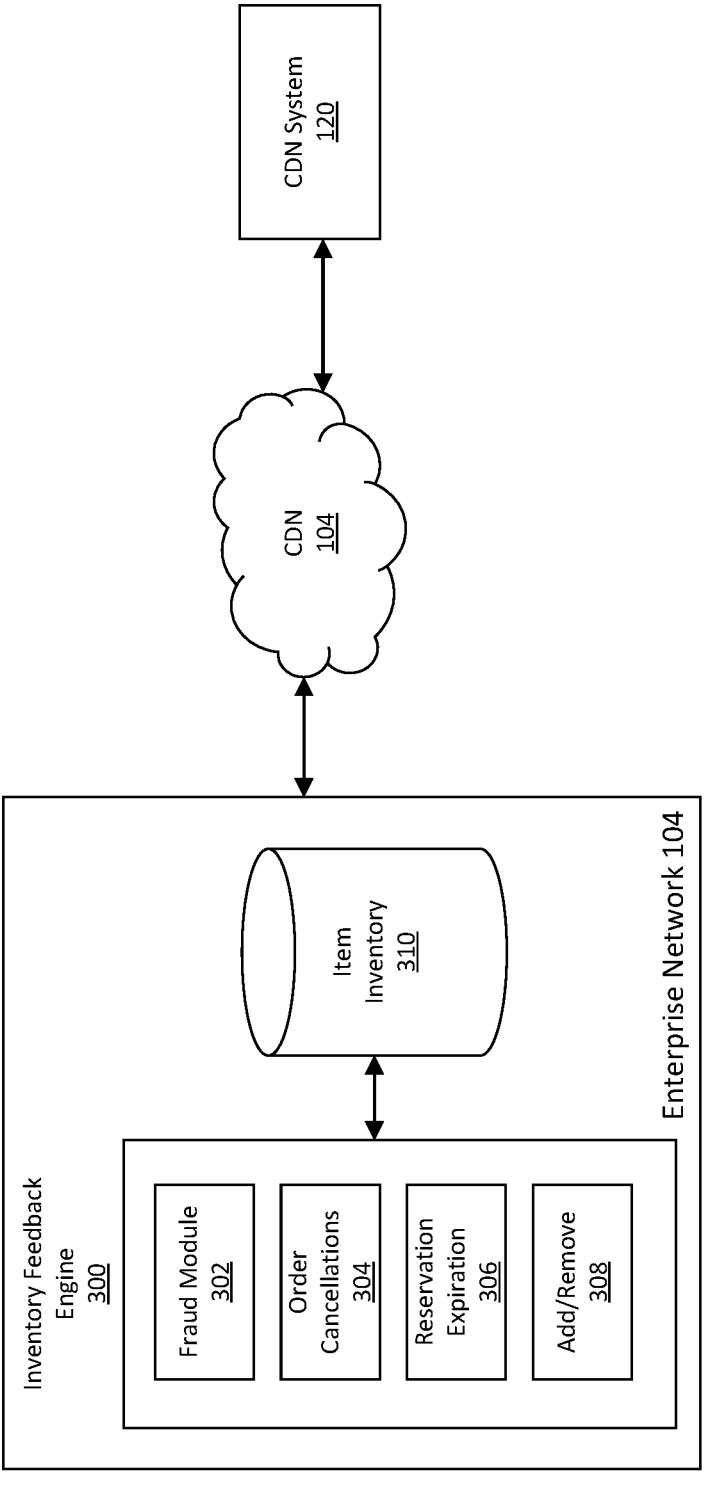
FIG. 3 is a block diagram of an inventory feedback engine in accordance with one or more embodiments of the invention.

FIG. 3 illustrates further aspects of an example inventory feedback engine 300 according to one or more embodiments of the invention. In some embodiments, inventory feedback engine 300 may be implemented in the enterprise network 104 such as that shown in FIG. 1. Inventory feedback engine 300 can be configured to exchange information associated with the remaining available inventory for high-demand items protected by the items queues. Inventory feedback engine 300 can be coupled to other networks such as CDN 106 to exchange information to manage the network traffic that is allowed into the enterprise network 104. In some implementations, inventory feedback engine 300 can include fraud module 302, order cancellation module 304, soft reservation expiration module 306, and add/remove inventory module 308. Fraud module 302 is configured to detect fraud such as payment fraud. Order cancellation module 304 is configured to track the number of orders that may be canceled by users. These orders may be canceled by users who added the item to their online cart and no longer desire to purchase the item or who have purchased the item and then canceled the item within a period of time. The number of units of inventory that have been canceled can be returned to the available inventory for purchase. Soft reservation expiration module 306 is configured to track users that have received access tokens and have not purchased the item(s) within the allotted period of time.

Inventory feedback engine 300 provides information that is used to adjust the admission count (virtual inventory) to ensure a high-sell through rate as some users who get through the queue can decide not to purchase the item or completed orders are canceled due to fraud checks or other reasons. The number of user requests that are admitted to the item queue is tracked. And the number of successfully completed purchases is also tracked. The number of completed purchases can be compared to the actual inventory to determine the remaining inventory that is available for purchase and the remaining inventory can be mapped to a virtual inventory that is used to determine how many user requests are allowed to enter the item queue which avoids over-selling an item.

The techniques described herein prevent users from entering the item queue if there is no actual inventory for the item remaining. This can improve the amount of traffic that is allowed into the enterprise network 104 during times of intense traffic spikes. The techniques described herein enable the rate of how many users are allowed through a queue per minute and the admission cap on the total number of users allowed through.

Figure 4:
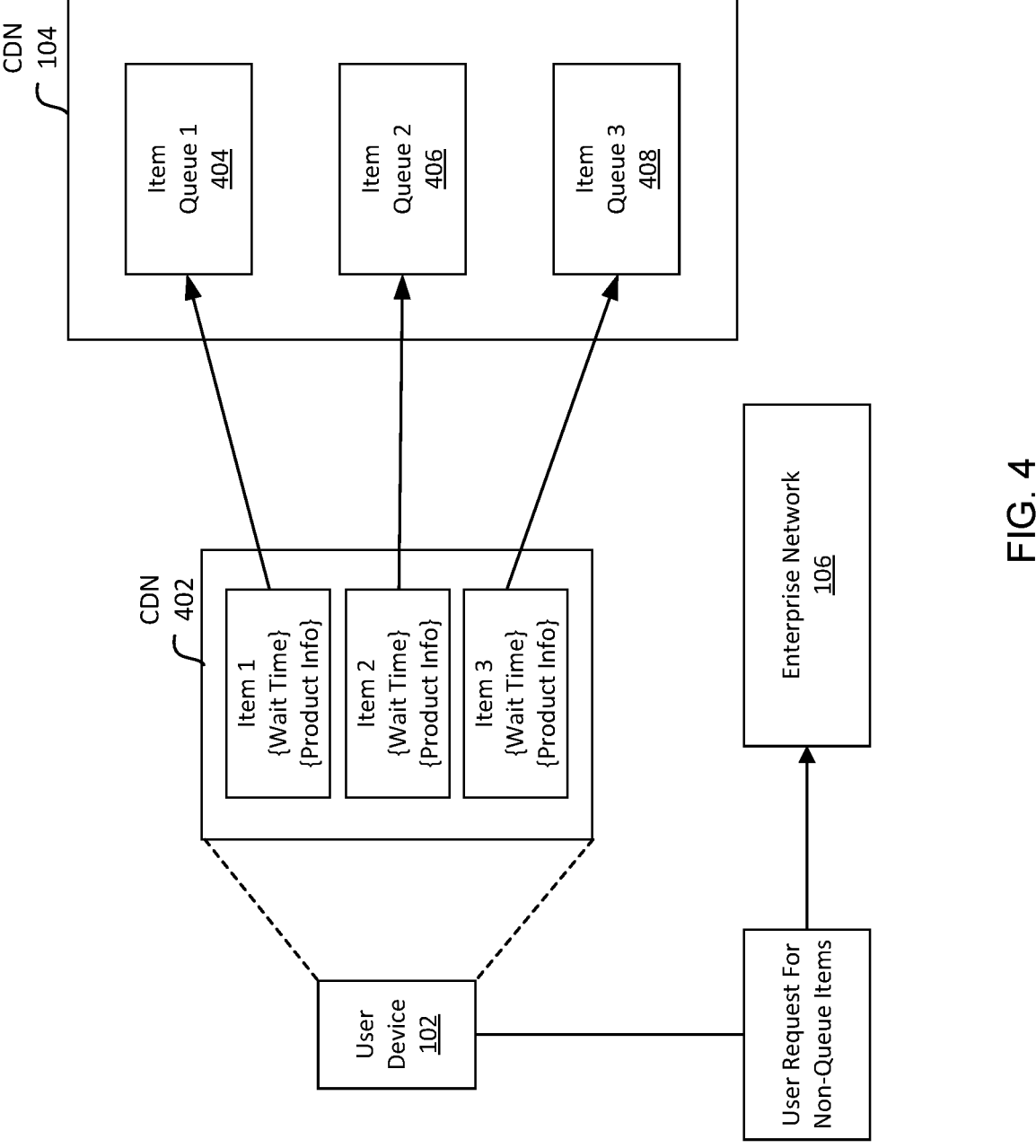
FIG. 4 is a block diagram of the queuing engine that supports multiple item queues corresponding to respective items in accordance with one or more embodiments of the invention.

FIG. 4 illustrates an example display of a user device 102. In some embodiments of the invention, a user may transmit multiple user requests for different items that are hot items, where each of the user requests is queued in the respective item queues. For example, the user device 102 has provided a user request for Item 1, Item 2, and Item 3, and each of these requests have joined Item Queue 1 (404), Item Queue 2 (406), and Item Queue 3 (408), respectively. In this example, the first hot item may be a gaming system, the second hot item may be sports equipment, and the third hot item may be a drone. Although only three item queues and their corresponding information are shown, it can be appreciated that any number of item queues can be implemented into the system and is not limited by the illustration shown in FIG. 4. Additionally, the user requests may be received from one or more user devices 102. Display 402 of the user device 102 provides status information for each user request. For example, for Item 1, the estimated wait time in the queue and product information are provided. The estimated wait time can be based on the position of the user request in the queue. Other factors such as the soft reservation period can also be factored in determining the estimated wait time for the user, where the soft reservation period allows a user request that has traversed the queue a fixed amount of time to complete the purchase. Similarly, for Item 2 and Item 3 corresponding wait times and product information are displayed. While the user is waiting for the opportunity to checkout and purchase the item, the user can continue to shop for other items offered by enterprise network 104. If the user requests are not for a hot item, the user request can be allowed to enter the enterprise network 104 without being queued in the CDN 106.

In some embodiments, when the user request reaches the head of the item queue or the estimated wait time has expired, the system can transmit a notification to the user device 102 indicating the user is now eligible to checkout and purchase the item. The user can then provide a checkout request or purchase request to the system which will then be forwarded to the enterprise network 104 for processing. Any items the user does not get through the item queue will not be available for checkout.

In one or more embodiments of the invention, a user may continue to interact with and shop on the website of the retailer while the corresponding user request for the hot item is pending in an item queue. In addition, it can be appreciated that the user can continue to purchase items that are not designated as hot items or high-demand items without entering an item queue.

Figure 5:
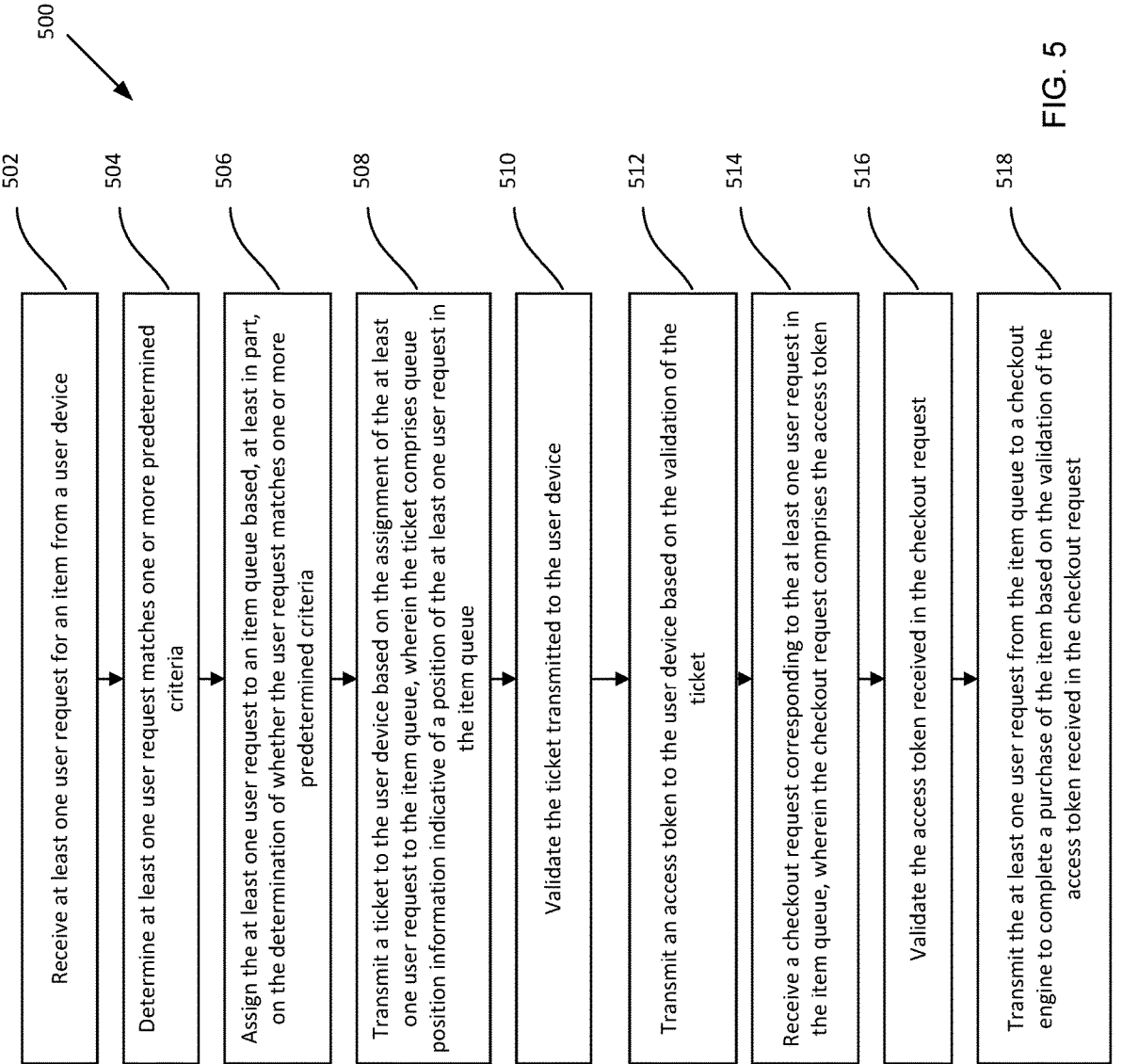
FIG. 5 is a flowchart of an exemplary method for implementing the queuing platform that can be carried out by the computing device and system 100 of FIG. 1 in accordance with one or more embodiments of the invention.

FIG. 5 is a flowchart of a method 500 for queueing user requests in accordance with one or more embodiments of the invention. Method 500 can be carried out by a computing device, such as the computing device 108 of FIG. 1. It can be appreciated method 500 can further be carried by the system 100 distributed in one or more CDNs 106 and is not limited to by the examples discussed herein. Beginning at step 502, computing device 108 receives at least one user request for an item from a user device. For example, the user request may include information related to a particular item, a user ID, etc. In one or more embodiments of the invention, computing device 108 may be located within a CDN 106, wherein the CDN 106 is geographically remote from the enterprise network 104.

At step 504, system 100 determines at least one user request matches one or more predetermined criteria. In some embodiments, the system is configured to analyze the received user request to determine whether the request is for a high-demand item. For example, the predetermined criteria can include a uniform resource locator (URL) path, a hypertext transfer protocol (HTTP) header, or a post body of the user requests. It can be appreciated that other information can be used to determine whether the user request is for a hot item and should not be limited by the examples described herein. In some embodiments, a user corresponding to the user request may be prompted to sign in to an account associated with the enterprise website to purchase the hot item. By signing in, the system can access additional information that can be used to verify a user request is an authentic user request (not a bot request).

At step 506, system 100 assigns the at least one user request to an item queue based, at least in part, on the determination of whether the user request matches the one or more predetermined criteria. If, however, the user request does not match any of the pre-determined criteria, the user request may be allowed to bypass the item queue and enter the enterprise network to complete the purchase of the item because the requested item has not been designated as a high-demand item.

Proceeding to step 508, system 100 transmits a ticket to the user device based on the assignment of the at least one user request to the item queue, wherein the ticket comprises queue position information indicative of a position of the at least one user request in the item queue. In some examples, the client is provided with the location to join the queue and the can issue a user request to join the queue. Alternatively, computing device 108 may determine the user request is a bot request. In such a scenario, computing device 108 transmits a ticket with a false wait time to the source of the user request so the particular user request corresponding to the bot will never advance through the item queue. By filtering the user requests that correspond to bots, the purchased inventory will be made available to real users and all the available inventory will not be automatically obtained by bot requests.

At step 510, system 100 validates the ticket transmitted to the user device. A ticket corresponding to a user request may be blocked for various reasons. In some embodiments, the validation module 118 performs the validation of the ticket. For example, if it is determined the user request is a bot request, the ticket will be blocked. Blocked tickets will not be validated and the corresponding user requests will not advance through the item queue. The ticket validation ensures that genuine user requests are processed by the enterprise network 104 and that bot requests are not.

At step 512, system 100 transmits an access token to the user device based on the validation of the ticket. In some embodiments, the token assignment module 126 is configured to transmit the access token to the user device 102. The access token allows the user request to bypass the queue and enter the enterprise network 104 to complete the purchase of the item. In some embodiments, the access token is transmitted to the user device 102 if two conditions are met. First, the user request has made it through its assigned item queue, and second, inventory remains available for the requested item. If no inventory is available for the item, then the system will not provide an access token to the user. The access token allows the queued user requests to exit the item queue and be forwarded to the checkout engine 132 to purchase the item corresponding to the user request. In one or more embodiments of the exemplary invention, the access token corresponds to the available inventory for purchase. As items are purchased, the available inventory for the respective items are decreased. By tracking the virtual inventory, computing device 108 can ensure that access tokens are issued only if the corresponding inventory is available.

Proceeding to step 514, system 100 receives, from the user device, a checkout request corresponding to the at least one user request in the item queue, wherein the checkout request comprises the access token. In some examples, when the user has traversed the queue and the inventory for the requested item is still available, the user of the user device may transmit a checkout request comprising the access token to purchase the item. Computing device 108 compares the received access token to the expected access token to validate the request. For example, the user device may receive a notification from computing device 108 indicating that user request to purchase the item has traversed the item and may now be purchased. The user device 102 may transmit the checkout request to computing device 108 in response to the notification. Computing device 108 will allow the user request corresponding to the checkout request to enter the checkout engine 132 in the enterprise network 104 to complete the purchase of the item.

At step 516, system 100 validates the access token received in the checkout request. Although the described example refers to a "checkout request" other types of purchase requests can be processed. At step 518, computing device 108 transmits the at least one user request from the item queue to a checkout engine 132 to complete a purchase of the item based on the validation of the access token received in the checkout request. In some implementations, computing device 108 can compare the access token of the user request with an expected access token for the user, the user request is transmitted to the checkout engine 132 located in the enterprise network 104. Also, the checkout engine 132 will also record used tokens and prevent the same token from being "replayed" or used multiple times. Otherwise, if the access token of the user request does not match the expected access token, the user request is not transmitted to the enterprise network 104 and may be queued again. Therefore, a user request that corresponds to a hot item will not be allowed to enter the enterprise infrastructure until the it has traversed the item queue. Computing device 108 controls which requests and the number of requests that are allowed to enter the enterprise network infrastructure which can mitigate any issues caused by spikes in network traffic associated with a hot item offering.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:

a processor; and a non-transitory memory storing instructions that, when executed cause the processor to:

receive at least one user request for an item from a user device;

determine whether the at least one user request matches one or more predetermined criteria;

in accordance with a determination that the at least one user request for the item matches the one or more predetermined criteria:

assign the at least one user request to an item queue;

in response to assigning the at least one user request to the item queue, transmit a ticket to the user device, wherein the ticket comprises queue position information indicative of a position of the at least one user request in the item queue;

validate the ticket transmitted to the user device;

in response to validating the ticket transmitted to the user device, transmit an access token, distinct from the ticket, to the user device;

receive, from the user device, a checkout request corresponding to the at least one user request in the item queue, wherein the checkout request comprises the access token;

in response to receiving the checkout request, determine whether the access token received in the checkout request corresponds to an expected access token for the item queue; and transmit the at least one user request from the item queue to a checkout engine to complete a purchase of the item in accordance with a determination that the access token received in the checkout request corresponds to the expected access token for the item queue; and in accordance with a determination that the at least one user request for the item does not match the one or more predetermined criteria and that the at least one user request corresponds to a bot request:

associate the at least one user request with a blocked ticket to block the bot request;

keep the blocked ticket in the item queue using a false wait time; and forgo transmitting the at least one user request associated with the blocked ticket from the item queue to the checkout engine.

2. The system of claim 1, wherein the instructions for determining whether the access token corresponds to the expected access token for the item queue cause the processor to:

compare the access token to the expected access token for the item queue; and forward the corresponding user request to an enterprise network to purchase the item if the access token is valid, otherwise, transmit a message to the user device to join the item queue if the access token is not valid.

3. The system of claim 1, wherein the one or more predetermined criteria comprises at least one of a uniform resource locator (URL) path, a hypertext transfer protocol (HTTP) header, or a post body of the at least one user request.

4. The system of claim 1, wherein the instructions cause the processor to:

transmit the false wait time to the user device based on the determination of the bot request.

5. The system of claim 4, wherein the determination of the bot request is based on identifying at least one of a customer identifier, internet protocol (IP) address, a join rate, account order history information, account creation information, or common shipping address.

6. The system of claim 1, wherein the processor is located within a content delivery network (CDN) coupled to an enterprise network, wherein the enterprise network comprises the checkout engine.

7. The system of claim 1, wherein the instructions cause the processor to provide an indication of an amount of time to checkout the item corresponding to the at least one user request based on the access token.

8. The system of claim 1, wherein the instructions cause the processor to track virtual inventory of the item, wherein the virtual inventory is based at least in part on a conversion rate, an expiration of a soft reservation, a cancellation rate, or a fraudulent transaction for the item.

9. The system of claim 8, wherein the instructions cause the processor to modify a queue admission rate for the at least one user request based at least in part on the virtual inventory.

10. The system of claim 9, wherein the assignment of the at least one user request to the item queue is based on an admission count and the virtual inventory.

11. A computer-implemented method, comprising:

receiving at least one user request for an item from a user device;

determining whether the at least one user request matches one or more predetermined criteria;

in accordance with a determination that the at least one user request for the item matches the one or more predetermined criteria:

assigning the at least one user request to an item queue;

in response to assigning the at least one user request to the item queue, transmitting a ticket to the user device, wherein the ticket comprises queue position information indicative of a position of the at least one user request in the item queue;

validating the ticket transmitted to the user device;

in response to validating the ticket transmitted to the user device, transmitting an access token to the user device;

receiving, from the user device, a checkout request corresponding to the at least one user request in the item queue, wherein the checkout request comprises the access token;

in response to receiving the checkout request, determining whether the access token received in the checkout request corresponds to an expected access token for the item queue; and transmitting the at least one user request from the item queue to a checkout engine to complete a purchase of the item in accordance with a determination that the access token received in the checkout request corresponds to the expected access token for the item queue; and in accordance with a determination that the at least one user request for the item does not match the one or more predetermined criteria and that the at least one user request corresponds to a bot request:

associating the at least one user request with a blocked ticket to block the bot request;

keeping the blocked ticket in the item queue using a false wait time; and forgoing transmitting the at least one user request associated with the blocked ticket from the item queue to the checkout engine.

12. The computer-implemented method of claim 11, wherein determining whether the access token corresponds to the expected access token for the item queue comprises:

comparing the access token to the expected access token for the item queue; and forwarding the corresponding user request to an enterprise network to purchase the item if the access token is valid, otherwise, transmitting a message to the user device to join the item queue if the access token is not valid.

13. The computer-implemented method of claim 11, wherein the one or more predetermined criteria comprises at least one of a uniform resource locator (URL) path, a hypertext transfer protocol (HTTP) header, or a post body of the at least one user request.

14. The computer-implemented method of claim 11, further comprising:

transmitting the false wait time to the user device based on the determination of the bot request.

15. The computer-implemented method of claim 14, wherein the determination of the bot request is based on identifying at least one of a customer identifier, internet protocol (IP) address, a join rate, account order history information, account creation information, or common shipping address.

16. The computer-implemented method of claim 11, further comprising providing an indication of an amount of time to checkout the item corresponding to the at least one user request based on the access token.

17. The computer-implemented method of claim 11, further comprising:

tracking virtual inventory of the item, wherein the virtual inventory is based at least in part on a conversion rate, an expiration of a soft reservation, a cancellation rate, or a fraudulent transaction for the item; and modifying a queue admission rate for the at least one user request based at least in part on the virtual inventory.

18. A non-transitory computer readable medium having instructions stored thereon, wherein the instructions, when executed by at least one processor, cause a device to perform operations comprising:

receiving at least one user request for an item from a user device;

determining whether the at least one user request matches one or more predetermined criteria;

in accordance with a determination that the at least one user request for the item matches the one or more predetermined criteria:

assigning the at least one user request to an item queue, wherein the one or more predetermined criteria comprises at least one of a uniform resource locator (URL) path, a hypertext transfer protocol (HTTP) header, or a post body of at least one or more user requests;

in response to assigning the at least one user request to the item queue, transmitting a ticket to the user device, wherein the ticket comprises queue position information indicative of a position of the at least one user request in the item queue;

validating the ticket transmitted to the user device;

in response to validating the ticket transmitted to the user device, transmitting an access token to the user device;

receiving, from the user device, a checkout request corresponding to the at least one user request in the item queue, wherein the checkout request comprises the access token;

in response to receiving the checkout request, determining whether the access token received in the checkout request corresponds to an expected access token for the item queue; and transmitting the at least one user request from the item queue to a checkout engine to complete a purchase of the item based on the validation of the access token received in the checkout request in accordance with a determination that the access token received in the checkout request corresponds to the expected access token for the item queue; and in accordance with a determination that the at least one user request for the item does not match the one or more predetermined criteria and that the at least one user request corresponds to a bot request:

associating the at least one user request with a blocked ticket to block the bot request;

keeping the blocked ticket in the item queue using a false wait time; and forgoing transmitting the at least one user request associated with the blocked ticket from the item queue to the checkout engine.

19. The non-transitory computer readable medium of claim 18, wherein the instructions, when executed by the at least one processor, cause the device to perform operations comprising:

comparing the access token to the expected access token for the item queue; and forwarding the corresponding user request to an enterprise network to purchase the item if the access token is valid, otherwise, transmitting a message to the user device to join the item queue if the access token is not valid.

20. The non-transitory computer readable medium of claim 18, wherein the instructions, when executed by the at least one processor, cause the device to perform operations comprising:

transmitting the false wait time to the user device based on the determination of the bot request, wherein the determination of the bot request is based on identifying at least one of a customer identifier, internet protocol (IP) address, a join rate, account order history information, account creation information, or common shipping address.

* * * * *